United States Patent [19]

Hayakawa et al.

[11] Patent Number: 4,903,548
[45] Date of Patent: Feb. 27, 1990

[54] SNAP RING SUPPORT DEVICE FOR AN AUTOMATIC TRANSMISSION

[75] Inventors: Youichi Hayakawa, Toyoake; Chihiro Hosono, Anjo; Masaaki Nishida, Anjo, all of Japan

[73] Assignee: Aisin AW Co., Ltd., Anjo, Japan

[21] Appl. No.: 293,255

[22] Filed: Jan. 4, 1989

[30] Foreign Application Priority Data

Aug. 1, 1988 [JP] Japan .................... 63-192354

[51] Int. Cl.$^4$ .................... F16H 41/00; F16H 57/00
[52] U.S. Cl. .................... 475/59; 475/146; 475/148; 475/281
[58] Field of Search .................... 74/730, 731, 732, 733, 74/867, 688; 192/70.28

[56] References Cited

U.S. PATENT DOCUMENTS

| | | | |
|---|---|---|---|
| 3,537,553 | 11/1970 | Olsen | 74/731 |
| 3,554,057 | 1/1971 | Midnay et al. | 74/732 |
| 3,564,938 | 2/1971 | Hause | 74/732 |
| 3,929,211 | 12/1975 | Maddock | 74/731 X |

FOREIGN PATENT DOCUMENTS 195961 12/1982 Japan .................... 74/730
17252 2/1983 Japan .................... 74/730

Primary Examiner—Leslie A. Braun
Assistant Examiner—Khoi Q. Ta
Attorney, Agent, or Firm—Kanesaka and Takeuchi

[57] ABSTRACT

In an automatic transmission provided with an automatic transmission mechanism section with a planetary gear unit and a torque converter, a snap ring groove is defined by an annular flange section for a stator shaft and a pump cover, and the reaction from a return spring is borne in the annular flange section. A stator shaft, which bears the stator reaction of a torque converter, is engagingly secured in a center hole section of an oil pump assembly, an annular flange section projecting to the radially outer side is formed at one end of the stator shaft, the snap ring groove is defined from the annular flange section and an annular recessed section of the oil pump assembly to receive the snap ring, and a receiving member for the return spring of the hydraulic actuator is maintained by the snap ring installed in the snap ring groove. Consequently, the return spring, which applies the return force to the piston of the hydraulic actuator, has its reaction force borne at the annular flange section of the stator shaft through the receiving member and the snap ring.

4 Claims, 6 Drawing Sheets

F I G. 2
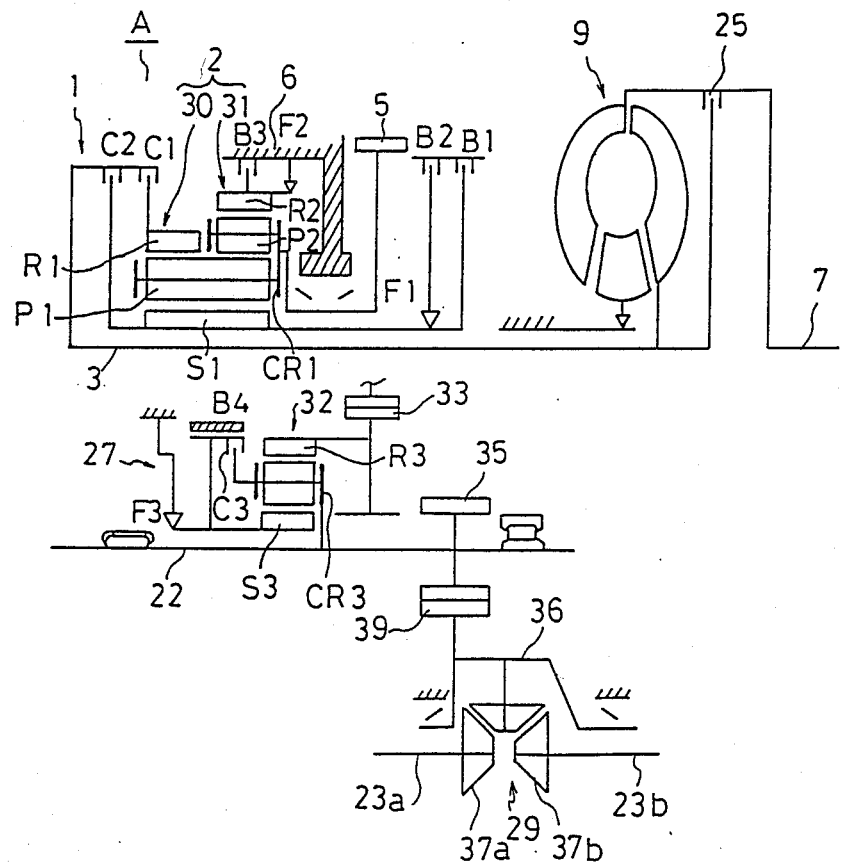

FIG. 3

| | | C1 | C2 | B1 | B2 | B3 | F1 | F2 | C3 | B4 | F3 |
|---|---|---|---|---|---|---|---|---|---|---|---|
| | | FIRST AUTOMATIC TRANSMISSION MECHANISM 1 | | | | | | | SECOND AUTOMATIC TRANSMISSION MECHANISM 27 | | |
| P | | | | | | | | | | ○ | |
| R | | | ○ | | | ○ | | | | ○ | |
| N | | | | | | | | | | ○ | |
| D | 1 | ○ | | | | | | ○ | | ○ | ○ |
| D | 2 | ○ | | (○) | ○ | | ○ | | | ○ | ○ |
| D | 3 | ○ | | (○) | ○ | | ○ | | ○ | | |
| D | 4 | ○ | ○ | | ○ | | | | ○ | | |
| 3 | 1 | ○ | | | | | | ○ | | ○ | ○ |
| 3 | 2 | ○ | | ○ | ○ | | ○ | | | ○ | ○ |
| 3 | 3 | ○ | | ○ | ○ | | ○ | | ○ | | |
| 2 | 1 | ○ | | | | | | ○ | | ○ | ○ |
| 2 | 2 | ○ | | ○ | ○ | | ○ | | | ○ | ○ |
| 1 | 1 | ○ | | | ○ | | | ○ | | ○ | ○ |
| 1 | 2 | ○ | | ○ | ○ | | ○ | | | ○ | ○ |

SNAP RING SUPPORT DEVICE FOR AN AUTOMATIC TRANSMISSION

BACKGROUND OF THE INVENTION

1. Field of the Invention

The present invention relates to a snap ring support device for an automatic transmission, and, in particular, to a recessed groove structure for a snap ring supporting a return spring for a hydraulic actuator.

2. Description of the Prior Art

Conventionally, an automatic transmission, as shown in FIG. 5(a) and (b), uses a hydraulic actuator 102 comprising a pair of cylinders 100a, 100b and a piston 101 to operate the clutch and brakes. The actuator 102 has a return spring 103 which is positioned on the rear surface of the piston 101. A receiving member 105 for retaining the return spring is held and prevented from being removed by means of a snap ring 107 mounted in an annular recessed groove 106 formed in each of the cylinders 100a, 100b. The reaction force of the return spring 103 is borne by the recessed groove 106 through the receiving member 105 and the snap ring 107.

In automatic transmissions, the development of higher horsepower vehicles and FF (front engine/front drive) vehicles, and the like has necessitated higher volume, more compactness (especially axial shortening), and more weight reduction, leading to a reduction in cost.

As shown in FIG. 5(a), reduction of weight can be provided by fabricating the cylinder 100a from a light weight material such as aluminum and the like, but use of a light weight material leads to a reduction in strength, making it necessary to position the recessed groove 106 at a prescribed distance from the end surface, so that the groove 106 receives the reaction force of the spring exerted on the snap ring 107 through the receiving member 105. This is one reason why a shortening of the axial dimension is hindered.

In addition, as shown in FIG. 5(b), when the cylinder 100b is formed from a high strength material such as steel or cast iron, it is possible to set the recessed groove 106 close to the end surface of the cylinder, but, the high strength material leads to a high specific gravity, and is a detergent to weight reduction.

SUMMARY OF THE INVENTION

An object of the present invention is to provide, with due consideration to the drawbacks of such conventional devices, a snap ring support device for an automatic transmission which eliminates these drawbacks by a groove for a snap ring defined by the stator shaft and the oil pump assembly.

In the present invention this object is achieved by the provision of an automatic transmission (A) comprising an automatic transmission mechanism section (1) comprising, as shown in FIG. 1 and FIG. 2, a planetary gear unit (2), a clutch (C1), (C2) for suitably connecting certain rotary elements (R1), (S1) of the planetary gear unit to an input shaft (3), stop means (B1), (B2), (F1), (B3), (F2) which suitably stop certain rotary elements (S1), (R2) of the planetary gear unit, and an output member (5) connected to the prescribed rotary elements of the planetary gear unit; and a torque converter (9) which transmits the rotation of the engine output shaft (7) to the input shaft (3). In the automatic transmission (A), an oil pump assembly (10) is positioned between the automatic transmission mechanism section (1) and the torque converter (9), and is secured to the casing (6). A hydraulic actuator (11) is provided on the oil pump assembly, and an annular recessed section (12) is formed on the outside edge of the outer peripheral surface of a boss section (20a) of the hydraulic actuator (11). In addition, a stator shaft (13) which bearingly supports the stator reaction of the torque converter (9) is insertedly secured in a center hole section (15) of the oil pump assembly (10). An annular flange section (13a) is formed, projecting from the outer diameter side on one end of the stator shaft (13), so that that flange section (13a) and the annular recessed section (12) together form a snap ring groove (a). A receiving member (17) for a return spring (18) for the hydraulic actuator (11) is retained by a snap ring (16) mounted in the snap ring groove (a).

In addition, in the oil pump assembly (10), a pump cover (20) made from an aluminum alloy is integrally secured to a pump body (19). The hydraulic actuator (11) is provided on the pump cover (20) and forms the annular recessed section (12). In addition, the stator shaft (11) is fabricated from steel.

The stop means has a first brake (B1) and a second brake (B2) which are activated when the gears are shifted upward from the first forward speed to the second forward speed. The first brake (B1) is directly connected to the rotary element (S1) of the planetary gear unit (2), and the second brake (B2) is connected to the rotary element (S1) through a one-way clutch (F1). The one-way clutch (F1), the first brake B1, and the second brake (B2) are arranged in the stated order in the radial direction from the radially inner side to the radially outer side. The hydraulic actuator (11) for the first brake and a hydraulic actuator (21) for the second brake are set in that order in the radial direction from the radially inner side to the radially outer side. Then, the hydraulic actuator (11) for which the reaction from the return spring (18) is borne on the snap ring groove (a) acts as the hydraulic actuator for the first brake.

In addition, the first and second brakes are formed so that they are activated together at the forward second speed in the D range.

Based on this configuration, the return spring (18) provides a return force to the piston of the hydraulic actuator (11), and this return force is bearingly supported at the annular flange section (13a) of the stator shaft (13) through the receiving member (17) and the snap ring (16). The stator shaft (13) is fabricated from a high strength material such as steel and the like and has a relatively thin flange section (13a), so that the spring reaction force is reliably supported, even with respect to the particularly large spring reaction force which occurs when the hydraulic actuator (11) is elongated, so that the spring (18) is compressed.

In addition, in the D range, when shifting up from the first speed to the second speed, both of the second brake (B2) which is activated through the one-way clutch (F1), and the first brake (B1) which is directly activated conjointly can adequately cope with even the large torque which is produced when the vehicle is accelerated.

Incidentally, the symbols in the parentheses are for reference only and are not restrictive with respect to the configuration. The same number may be named differently in the following description and in the previous description in which broader concepts are adopted.

BRIEF DESCRIPTION OF THE DRAWINGS

FIG. 2 is a schematic view showing an automatic transmission applicable to the present invention.

FIG. 3 is a display showing the action of the automatic transmission of FIG. 2.

FIG. 5 is a cross-sectional view showing an example of a conventional snap ring support device, wherein

DETAILED DESCRIPTION OF THE PREFERRED EMBODIMENTS

Figure 1:
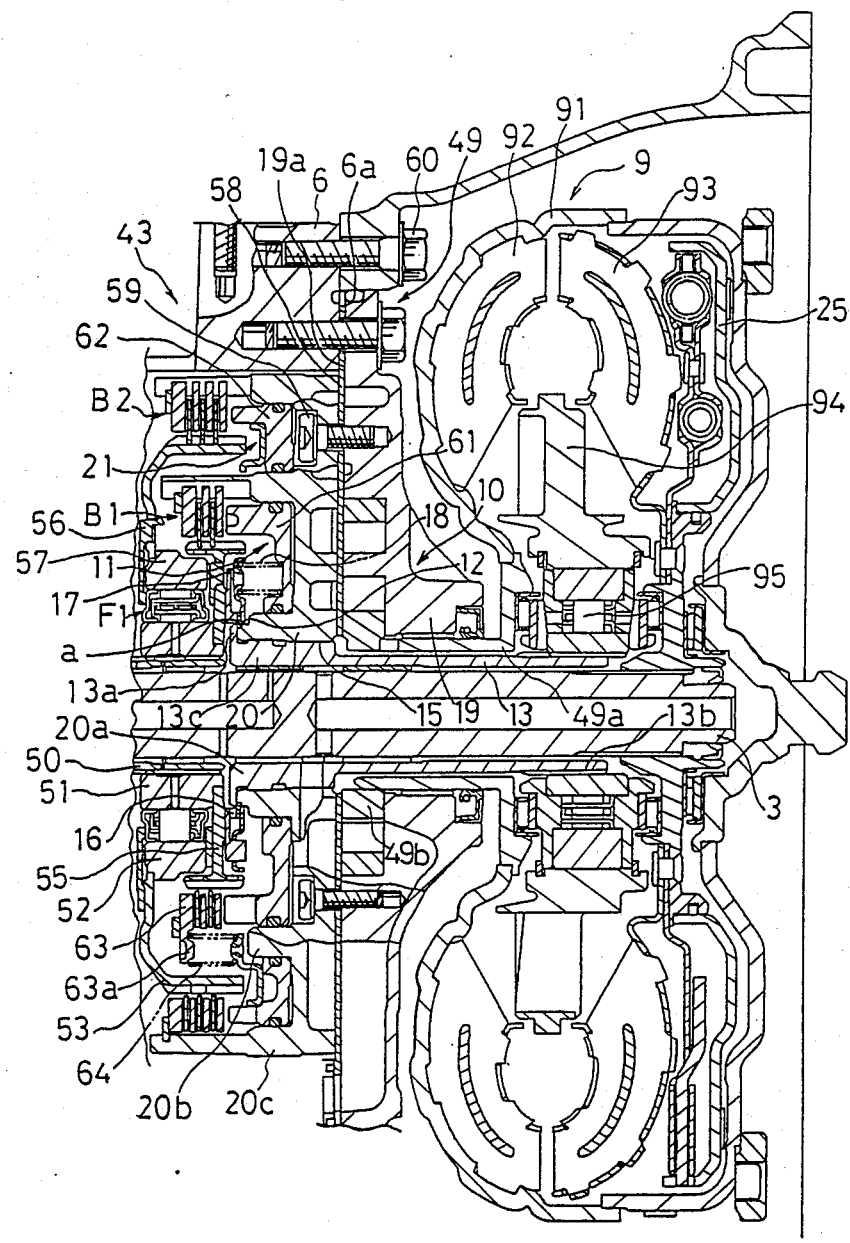
FIG. 1 is a cross-sectional view showing the snap spring support device of the present invention.

An embodiment of the present invention will now be described with reference to the drawings.

Now referring to FIG. 2, an automatic transmission A applicable to the present invention comprises three shafts, that is an input shaft 3 aligned with an engine crank shaft 7, a counter shaft 22, and a front axle shaft 23a, 23b. A first automatic transmission mechanism section 1 and a torque converter 9 with a lockup clutch 25 are supported on the input shaft 3, and a second automatic transmission mechanism section 27 is supported on the counter shaft 22. A front differential device 29 is supported on the front axle shaft 23a, 23b.

The first automatic transmission mechanism section 1 comprises a planetary gear unit 2 assembled from a single planetary gear 30 and a dual planetary gear 31. In the planetary gear unit 2, the common sun gear S1 of the two planetary gears and the common carrier CR1 are integrally linked, and in addition, a long pinion P1 is engaged with the sun gear S1. The input shaft 3 and a ring gear R1 of the single planetary gear 30 are linked through a first (forward) clutch C1, and the input gear 3 and the sun gear S1 are linked through a second (reverse and direct) clutch C2. The sun gear S1 is directly engaged with and stopped by the first brake B1, and prevented from rotating in one direction by means of the second brake B2 through a first one-way clutch F1. A ring gear R2 of the dual planetary gear 31 is directly engaged with and stopped by a third brake B3, and prevented from rotating in one direction by a second one-way clutch F2. The carrier CR1 is linked to a counter drive gear 5 which is supported on the casing bulkhead. The gear 5 is an output member of the automatic transmission mechanism section 1. The second automatic transmission mechanism section 27 has a single planetary gear 32. The sun gear S3 and a carrier CR3 of the planetary gear 32 are linked to each other through a third (direct) clutch C3. In addition, the sun gear S3 is directly engaged with and stopped by a fourth (under-drive) brake B4, and is prevented from rotating in one direction by means of a one-way clutch F3. The ring gear R3 engages the counter drive gear 5 and is linked to a counter-driven gear 33 which is the input member of the automatic transmission mechanism section 27. The carrier CR3 is linked to the counter shaft 22. A reducing gear 35 which is the output member of the automatic transmission mechanism section 27 is secured to the counter shaft 22.

The front differential device 29 comprises a differential carrier 36 and a pair of left and right sun gears 37a, 37b. A ring gear 39 is secured to a gear mounting casing which forms the differential carrier 36. The ring gear 39 engages the reducing gear 35 to complete the configuration of the speed reducing mechanism. The left and right gears 37a, 37b are linked to the left and right front axle shafts 23a, 23b respectively.

The operation of the automatic transmission A will now be explained with reference to FIG. 3.

The rotation of the engine crank shaft 7 is transmitted to the input shaft 3 through the torque converter 9 or the lockup clutch 25. In the first speed status in the D range, the first clutch C1 is placed in an engaged state, and the fourth brake B4 is in a stopped state. In this status, in the first automatic transmission mechanism section 1, the rotation of the input shaft 3 is transmitted to the ring gear R1 of the single planetary gear 30 through the first clutch C1, and the ring gear R2 of the dual planetary gear 31 is prevented from rotating by the second one-way clutch F2, so that while the sun gear S1 is idling in the reverse direction, the common carrier gear CR1 is caused to rotate at a greatly reduced speed in the forward direction, and rotation is produced through the counter drive gear 5. In the second automatic transmission mechanism section 27, the sun gear S3 is stopped by means of the fourth brake B4 and the third one-way clutch F3, so that the rotation from the counterdriven gear 33 is produced as a reduced speed rotation in the carrier CR3 from the ring gear R3. Accordingly, the first speed rotation of the first automatic transmission mechanism section 1 and the reduced speed rotation of the second automatic transmission mechanism section 27 are combined, and the rotation is transmitted to the front differential device 29 through the reducing gear 35 and the ring gear 39, and is then transmitted to the left and right front axle shafts 23a, 23b.

In the second speed status in the D range, the second brake B2 is activated in addition to the connection of the first clutch C1 and the action of the fourth brake B4. Whereupon the rotation of the sun gear S1 is halted from the action of the first one-way clutch F1 based on the brake B2. Accordingly, with the rotation of the first ring gear R1 through the input shaft 3, while the ring gear R2 of the dual planetary gear 31 is being idled in the forward direction, the carrier CR1 rotates with reduced speed in the forward direction, and the rotation is produced as the second speed in the counter drive gear 5. The second automatic transmission mechanism section 27 remains unchanged at reduced speed. The second speed of the first automatic transmission mechanism section 1 is combined with the reduced rotation of the second automatic transmission mechanism section 27, and the resulting rotation is transmitted to the front axle shaft 23a, 23b.

In the three-spaced status in the D range, the first automatic transmission mechanism section 1 maintains the two-speed status without change, and when the fourth brake B4 in the second automatic transmission mechanism section 27 is released, the third clutch C3 is placed in engagement. Whereupon the carrier CR3 and the side gear S3 become connected to each other, and the planetary gear 32 rotates in an integral manner to produce direct rotation in the counter shaft 22. At this time, the fourth brake B4 is released a little before the engagement of the third clutch C3, and shifting is made by the third one-way clutch F3 preventing transmission from becoming impossible. Accordingly, the two-speed rotation of the first automatic transmission mechanism section 1 and the direct rotation of the second automatic transmission mechanism section 27 are combined, and the third speed is obtained as a whole in the automatic transmission A.

When shifting down to the second or third gear in the D range, the first brake B1 is also activated, so that the engine acts as a brake when coasting.

The fourth speed status in the D range is obtained from the three-speed status with the second clutch C2 placed in engagement. Whereupon, rotation is transmitted to the ring gear R1 through the first clutch C1 from the input shaft 3, and to the sun gear S1 through the second clutch C2. The planetary gear unit 2 rotates integrally, and rotation is directly transmitted to the counterdriven gear 5. Then, the directly connected rotation of the first automatic transmission mechanism section 1 and the directly connected rotation of the second automatic transmission mechanism section 27 are combined. In addition, the counter drive gear 5 and the driven gear 33 are in a prescribed acceleration relationship, so that the entire automatic transmission A is subjected to overdrive rotation. At this time, in the case where the first brake B1 is activated in the second and third speeds, when an upshift is made to the fourth speed, the first brake B1 is activated a little ahead of time, so that while the sun gear S1 is being stopped by the one-way clutch F1, the second clutch C2 is engaged, and shift shock is prevented by means of interchange.

In addition, the third range is the same as the status where the first brake B1 is activated during the application of the second and third speeds in the previously mentioned D range having the first, second and third speeds.

Also, the second range is the same as the first and second speed status in the above third range.

In the first speed status in the first range, in addition to the engagement of the first clutch C1 and the action of the fourth brake B4, the third brake B3 is activated. In this status, the ring gear R2 is stopped when engaged by the second one-way clutch F2, the third brake B3 is stopped without regard to the direction of rotation, so that the engine brake is activated. In addition, the second speed status is the same as the second speed status in the second range.

In the reverse range, the second clutch C2 is engaged, and at the same time, the third brake B3 and the fourth brake B4 are activated. In this status, the rotation of the input shaft 3 is transmitted to the sun gear S1 through the second clutch C2. Also in this status, the ring gear R2 of the dual planetary gear 31 is secured by the action of the third brake B3, so that while the ring gear R1 of the single planetary gear 30 is made to rotate in reverse, the carrier CR1 also rotates in reverse, and the reverse rotation of the carrier is produced at the counter drive gear 5. Further, the speed of the reverse rotation of the counter drive gear 5 is reduced by the second automatic transmission mechanism section 27 and is transmitted to the front axle shaft 23a and 23b.

Next, an explanation will be given of the automatic transmission A by means of a specific embodiment with reference to FIG. 4.

The automatic transmission A has an integral casing apparatus comprising a transaxle casing 6, a transaxle housing 41, and a rear cover 42. The input gear 3, the counter shaft 22, and the ring gear mounting casing 36 which is differential carrier of the front differential device 29 are supported in a freely rotatable manner in the casing apparatus. Then, the torque converter 9 which has a lockup clutch, and the first automatic transmission mechansim section 1 are positioned on the input shaft 3. The second automatic transmission mechanism section 27 is positioned on the counter shaft 22. In addition, a valve body 44 is positioned on the transaxle casing 6.

In the first automatic transmission mechanism section 1, a brake section 43, an output section 45, the planetary gear unit 2, and a clutch section 47 are arranged in order in the axial direction from the engine crank shaft 7 to the rear. An oil pump 49 is positioned between the brake 43 and the torque converter 9. A hollow shaft 50 is penetrated and supported in a freely rotating manner by the input shaft 3.

The planetary gear unit 2 comprises the single planetary gear 30 and the dual planetary gear 31, as shown in FIG. 2. The single planetary gear 30 comprises the sun gear S1 formed on the hollow shaft 50, the ring gar R1, and the carrier CR1 which supports the pinion P1 which engages the ring gear R1 and the sun gear S1. The dual planetary gear 31 comprises the sun gear S1 formed on the hollow shaft 50, the ring gear R2, and the carrier CR1 which supports the first pinion P1 and the second pinion P2 in a mutually engaging manner, wherein the first pinion P1 is engaged with the sun gear s1, and the second pinion P2 is engaged with the ring gear R2. Both the planetary gears 30, 31 have commonly a single gear with the same number of teeth that is the sun gear S1 on the hollow shaft 50. The carrier C4 is integrally formed and the pinion P1 is formed from an integral long pinion.

As shown in detail in FIG. 1, the first one-way clutch F1, the first brake B1 comprising a multiple plate brake and the second brake B2 comprising a multiple plate brake are arranged in the brake section 43 in order from the radially inner side in the radially outer direction. In the first one-way clutch F1, the tip of the hollow shaft 50 is engaged through a spline with an inner race 51, and a radially outwardly projecting hub 53 for the second brake is secured to the outer race 52. In addition, a hub 55 for the first brake is secured on the front side (engine side) of the inner race 51 of the one-way clutch F1. A ring-shaped thrust washer 56 with a claw section is mounted on the hub 53 for the second brake with the claw section engaged with an opening in the hub 53. Also, a ring-shaped thrust washer 57 is mounted on the hub 55 for the first brake. The one-way clutch F1 is insertedly maintained in the thrust washers 56, 57. The oil pump assembly 10 comprises an oil pump 49, a pump cover made from an aluminum die casting, a pump plate 58 inserted into the pump body 19, and a bolt 59 which integrally secures the assembly. The junction surface 19a of the body 19 is secured by the bolt 60 to the junction surface 6a of the casing 6, with the cover 20 inserted into the transaxle casing 6. On the rear side of the oil pump cover, a boss section 20a, a first collar section 20b, and a second collar section 20c are annularly and consecutively formed, protruding in the axial direction from the radially inner side. The first brake B1 is interposed between a comb-tooth shaped section of the first collar section 20b and the hub 55 for the first brake. Similarly, the second brake B2 is interposed between a comb-tooth shaped section of the second collar section 20c and the hub 53 for the second brake. In addition, a cylinder of the ring-shaped hydraulic actuator 11 for the first brake is formed between the boss section 20a and the first collar section 20b. A piston 61 is fitted into this cylinder in an oil tight manner, and a lug section of the piston 61 is extended in the axial direction to contact and activate the first brake B1. Also, a cylinder of the ring-shaped hydraulic actuator 21 used for the second brake is formed between the first collar section 20b and the second collar section 20c. A piston 62 is fitted into this cylinder in an oil tight manner, and a lug section of the piston 62 is extended in the axial direction to contact and activate the second brake B2. Further, an annular recessed section 12 notched into a step shape is formed in the tip corner section of the boss section 20a. One part of an end plate 63 of the first brake, which is retained by a snap ring in the second collar section 20c, protrudes to the outer diameter side and forms the spring receiving section 63a. A return spring 64 of the hydraulic actuator 21 for the second brake is interposed between the receiving section 63a and a lug provided at the rear surface of the piston 62.

The torque converter 9 is provided with a converter housing 91 linked to the engine crank shaft 7 (FIG. 2), and further with a pump impeller 92 and a lockup clutch 25 connected to the housing 91, a turbine impeller 93 connected to the input shaft 3, and an stator 94 positioned between the two impellers 92, 93. A pump sleeve 49a is secured to the base of the tip of the converter housing 91. The sleeve 49a extends into the pump body 19 and has its tip secured to a pump drive gear 49b. The stator 94 is secured to the outer race of the one-way clutch 95. In addition, the inner race of the one-way clutch 95 is engaged through a spline to the stator shaft 13. The stator shaft 13 is a hollow shaft fabricated from steel. The pump sleeve 49a is positioned on the outer circumference side of the stator shaft 13, and the input shaft 3 is positioned on the inner circumference side to form a relatively freely rotatable triple shaft. One end of the stator shaft 13 forms a spline section 13b which engages the inner race of the one-way clutch 95. The other end of the stator shaft 13 is bulged in a radially outward direction to form a thickened section 13c. The thickened section 13c is secured by being pressed into the center hole section 15 of the pump cover 20. Formed in this end of the stator shaft 13 is an annular flange section 13a which projects even further in the outward radial direction from the thickened section 13c for a comparatively short distance.

The inside of the flange section 13a is engaged in intimate contact with the outside surface of the pump cover 20. The snap ring groove a is defined by the flange section 13a and the annular recessed section 12 of the corner section of the pump cover. The spring receiving member 17 and the snap ring 16 are installed in the snap ring groove a. The snap ring 16 supports the receiving member 17 to prevent it from being ejected. The return spring 18 is fitted by compression between the receiving member 17 and the rear surface of the piston 61 of the first hydraulic actuator 17.

Figure 4:
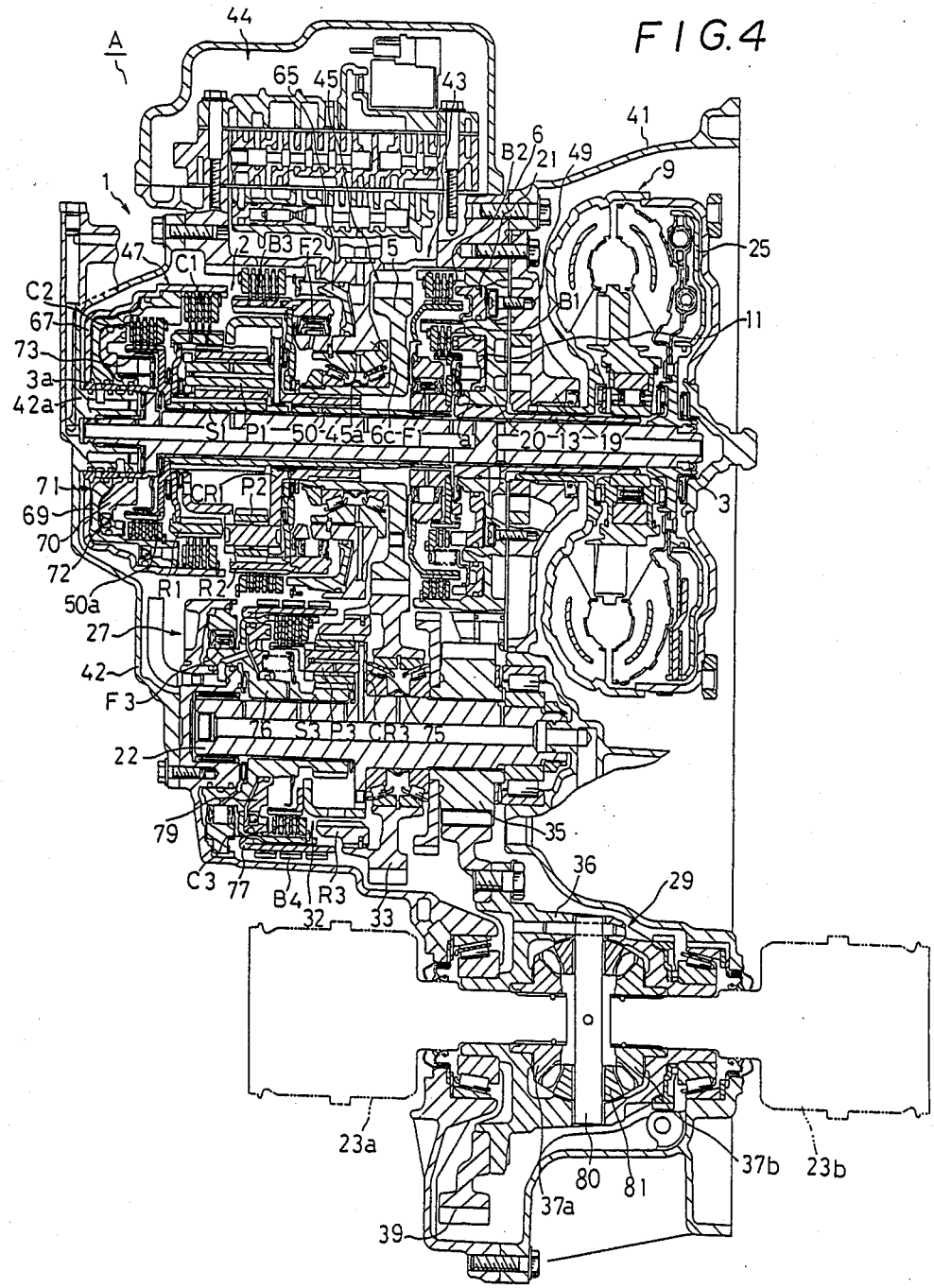
FIG. 4 is a cross-sectional view showing the complete automatic transmission of FIG. 2.
Figure 5A:
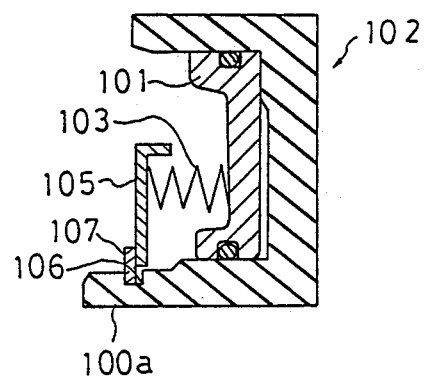
FIG. 5(a) shows a case where the cylinder is fabricated from a light material and FIG. 5(b) shows a case where the cylinder is fabricated from a high-strength material.
Figure 5B:
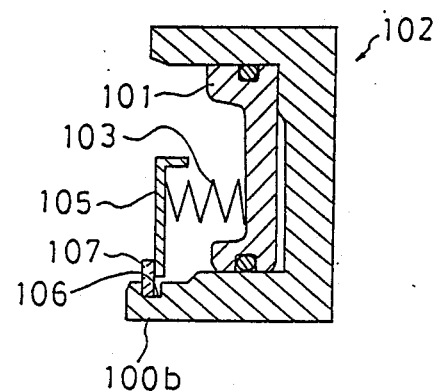

The output section 45, as shown in FIG. 4, is positioned at almost dead center of the first automatic transmission mechanism section 1. The counter drive gear 5 is supported in a freely rotable manner on the bulkhead 6c formed in the transaxle casing 6 through a double tapered bearing 45a. The counter drive gear 5 has a boss section which is connected to the carrier CR1 of the planetary gear unit 2. The outer race of the bearing 45a is engaged by a spline to the inner peripheral surface of the casing bulkhead 6c, and the second one-way clutch F2 is mounted on the outer peripheral surface of the race extension section.

The outer race of the second one-way clutch F2 is secured to the ring gear R2 of the dual planetary gear 31, and the ring gear R2 is supported in the axial direction by a support plate which is interposed between the counter gear boss section and the carrier CR1 through a thrust bearing. Accordingly, the second one-way gear F2 is juxtaposed in the axial direction between the planetary gear unit 3 and the casing bulkhead 6c. In addition, the third brake B3 is interposed between the outer periphery of the ring gear R2 and the axle casing 6, and a cylinder is formed on one side of the surface section of the bulkhead 6c. In addition, the hydraulic actuator 65 formed from a piston is interposedly positioned between the one-way clutch F2 and the cylinder. Further, the hydraulic actuator 65 is provided with a cylindrical, comb-tooth shaped arm. This arm extends in the axial direction through the radially outer side of the second one-way clutch F2, so that a return spring is arranged in the combtooth section and the third brake B3 is controlled.

The clutch section 47 is provided with the first (forward) clutch C1 and the second (direct) clutch C2 and is positioned at the rear edge of the first automatic transmission mechanism section 1 and housed in the rear cover 42. In addition, the rear edge section of the input shaft 3 forms the sleeve section 3a by which the boss section 42a of the cover 42 is engaged. In addition, a clutch drum 67 is integrally linked to the sleeve section 3a. A movable member 69 is engaged to freely slide only in the axial direction on the clutch drum 67 by means of a spline. A piston member 70 is fitted with the movable member 69. In addition, the movable member 69 defines an oil chamber cooperating with the cylinder which is formed from the inner peripheral surface of the clutch drum 67, thereby forming a hydraulic actuator 71 for use with the first clutch C1. A piston member 70 defines an oil chamber cooperating with the cylinder formed from the inner peripheral surface of the movable member 69, thereby forming a hydraulic actuator 72 for use with the second clutch C2. Set between the piston member 70 and the snap ring secured to the sleeve 3a is a snap ring 73 which is compressed through a receiving member. The snap ring 73 forms a return spring which is common to the piston members 69, 70 of the hydraulic actuators 71, 72. In addition, the first clutch C1 is interposed between the spline formed on the inner peripheral surface of the radially outer section of the clutch drum 67 and the spline formed on the outer peripheral surface of the ring gear R1. The second clutch C2 is interposed between the spline formed on the inner peripheral surface of the radially outer section of the movable section 69 and the spline formed on the outer peripheral surface of the hub section 50a secured to the hollow shaft 50.

The second automatic transmission mechanism section 27 is provided with one single planetary gear 32. Also, the counter driven gear 33 is supported in a freely rotatable manner on the counter shaft 22 through a bearing 75, and the reducing gear 35 is secured to the counter shaft 22. The ring gear R3 of the planetary gear 32 is linked to the counterdriven gear 33. The carrier CR3 which supports the pinion P3 is integrally formed by expansion in the radially outer direction of the counter shaft 22. The sun gear S3 is formed on a hub 76 which is supported in a freely rotatable manner on the shaft 22. A drum 77 secured to the radially outer section of the hub is engaged on its outer peripheral surface by the fourth brake B4 which is a hand brake. The third clutch C3 is interposed between the inner peripheral surface of the drum 77 and the hub secured to the carrier CR3. A piston engages the hub 76 adjacent to the clutch C3 and forms a hydraulic actuator for the clutch C3. The third one-way clutch F3 is interposed between the elongated section of the hub 76 and the casing 6.

The front differential device 29 is provided with the ring gear mounting casing 36 which forms a differential carrier. The casing 36 is supported in freely rotatable manner on the housing 41 and casing 6 through a bearing. The large diameter ring gear 39 which engages the reducing gear 35 is secured to the mounting casing 36. In its inner section, a pinion gear 81 is supported in a freely rotatable manner by a pinion shaft 80, and the right and left side gears 37a, 37b which engage the gear 81 are supported in a freely rotatable manner. A pair of right and left front axle shafts 23a, 23b are respectively engaged and linked by the side gears 37a, 37b.

Next, the action of the automatic transmission A will be explained.

The rotation of the engine crank shaft is transmitted to the housing 91 of the torque converter 9. The oil flow activates a turbine impeller 93 by means of a pump impeller 92 and then returns to the pump impeller 92 via the stator 94. At this time, a torque acts on the stator 94 and a torque differential is produced between the rotors of the pump and the turbine. However, the reaction of the torque which acts on the stator 94 is transmitted to the stator shaft 13 through a one-way clutch 95, and is borne on the pump cover 20 which is fittingly engaged by the shaft 13. When the oil flow from the turbine impeller 93 acts on the rear surface of the stator 94, the stator 94 idles from the action of the one-way clutch 95. The rotation of the turbine impeller and the lock-up clutch 25 is transmitted to the input shaft 3. The rotation of the housing 91 is transmitted to the drive gear 49b through the pump sleeve 49a to drive the oil pump 49.

In the first speed status of the automatic transmission A, a prescribed oil pressure is supplied to the oil chamber of the hydraulic actuator 70, the clutch drum 67 acts as a cylinder to move the movable member 69 against the spring 73, so that the first clutch C1 is engaged, and the fourth brake B4 is activated. In this status, the rotation of the input shaft 3 is transmitted to the first clutch C1 through the clutch drum 67, and is transmitted to the ring ger R1 of the single planetary gear. Further, in this status, the ring gear R2 of the dual planetary gear is prevented from rotating by the second one-way clutch F2, so that while the sun gear S1, that is the hollow shaft 50 is caused to idle, and the rotational speed of the carrier CR1 is reduced, and this rotation is produced from the counter drive gear 5. Then, the rotation is transmitted to the ring gear R3 of the second automatic transmission mechanism section 27 through the driven gear 33 which engages the counter drive gear 5. Through a stoppage of the sun gear S3 by means of the fourth brake B4 and the third one-way clutch F3, reduced speed rotation is produced from the carrier CR3, and this rotation is transmitted to the left and right front axle shafts from the front differential device 29 through the reduction gear 35 and the ring gear 39.

When shifting up from the first speed to the second speed, while in the above mentioned first speed status, oil pressure is supplied to the oil chamber of the hydraulic actuator 21, the piston 62 is extended, and the second brake B2 is engaged. When this occurs, the rotation of the sun gear S1 that is the hollow shaft 50 is prevented through the first one-way clutch F1. In this status, the rotation which is transmitted from the input shaft 3 through the clutch C1 to the ring gear R1 is transmitted as reduced speed rotation to the carrier CR1 while the ring gear R2 is idling. The reduced speed rotation is taken out from the counter drive gear 5, reduced by means of the second automatic transmission mechanism section 27, and transmitted to the front differential device 29. At this time, when an upshift occurs, a large torque is activated in the automatic transmission A, and the reaction force of the sun gear S1 caused by these large torque is supported by the second brake B2 through the one-way clutch F1. The second brake B2, which is positioned on the radially outer side, is able to reliably bear this large torque, for it can be provided with a comparatively large number of plates because a larger space is available there.

In addition, when a downshift is made from the fourth or third speeds to the second speed, oil pressure is also applied to the oil chamber of the hydraulic actuator 11, and the piston 61 is extended to stop the first brake B1. As a result, the second brake B2 cannot function as a result of the idling of the one-way clutch F1 and the first brake B1 directly engages the sun gear S1 and the braking effect of the engine is activated. Also at this time, the torque activated in the first brake B1, in which this torque originates, is comparatively small, and even, though there is a limited number of plates in the first rake B1 positioned on the radially inner side, the first brake B1 can adequately cope with the torque. In addition, based on the extension of the piston 61 of the hydraulic actuator 11, when a large compressive force is activated on the return spring 18, this compressive force is reliably borne by the annular flange section 13a of the stator shaft 13, which is fabricated from a high strength material, through the receiving member 17 and the snap ring 16.

In addition, in the third speed status, the first automatic transmission mechanism section 1 remains in the second speed status. In the second automatic transmission mechanism section 27 the fourth brake B4 is released and oil pressure is activated in a hydraulic actuator 79 and applied to the third clutch C3. As a result, the planetary gear 32 becomes directly coupled, and the rotation is transmitted to the front differential device 29.

When shifting up from the third speed to the fourth speed, oil pressure is applied to the hydraulic actuator 72 and this pressure is applied to the second clutch C2. As a result, the rotation from the input shaft 3 is transmitted to both the ring gears R1, R2 through the first and second clutches C1, C2, the planetary gear unit 2 integrally rotates, and the rotation is transmitted directly to the front differential device 29 through the direct rotation of the second automatic transmission mechanism section 27.

In addition, in the reverse range, oil pressure is applied to the hydraulic actuators 72 and 65, and both of the second clutch C2 and the third clutch C3 are also placed in engagement. In this status the rotation of the input gear 3 is transmitted to the sun gear S1 through the second clutch C2, and, based on the halt of the ring gear R2, reverse rotation is produced from the carrier CR1 and this reverse rotation is transmitted to the front differential device 29 through the reduced speed rotation of the second automatic transmission mechanism section 27.

In the abovementioned embodiment of the present invention, the explanation was given to the automatic transmission A comprising the first automatic transmission mechanism section 1 with the three forward speeds and the second automatic transmission mechanism section 27 with the direct speed and reduced speed switching. However, this is not restrictive to the present invention. As revealed in Japanese Laid Open Patent No. SHO-62-141342, an automatic transmission using four forward speeds of an automatic transmission mechanism section, or other automatic transmissions can, of course, be applied.

TECHNICAL ADVANTAGES OF THE INVENTION

As outlined in the above explanation, the present invention relates to a groove (a) for a snap ring defined by the annular flange section (13a) of a stator shaft (13) and a pump cover (20), so that processing of the groove is unnecesary. In particular, in the pump cover (20) with a pair of collar sections (20b), (20c) projecting in the axial direction from the boss section (20a) on the radially outer side of the boss section (20a), the collars constitute a hindrance, and processing of the groove is extremely troublesome, but the groove (a) for the snap ring can be formed by merely attaching the stator shaft (13) to the pump cover (20), so that processing costs can be reduced. In addition, because the reaction to the return spring (18) is borne by the flange section (13a) of the stator shaft (13) which is fabricated from a high strength material, a thin flange section (13a) is sufficient. The automatic transmission (A) can be short in the axial direction making it possible to provide improved performance when this unit is installed as an FF automatic transmission.

In addition, the pump cover (20) is fabricated from an aluminum alloy and the stator shaft 13 from steel, so the pump cover (20) can be extremely light, in comparison with a cover fabricated from a heavy cast iron material, so that the groove (a) for the snap ring can be positioned close to the end surface, the shaft length can be shortened in the axial direction, and the comb-tooth shaped collars (20b), (20c) can be precisely formed in die cast aluminum, so that only little machining is required.

Also, when applied to the snap ring groove (a) to bear the reaction of the return spring (18) for the hydraulic actuator 11 used with the first brake in the brake section (42) in which the first one-way clutch (F1), the first brake (B1), and the second brake (B2) are arranged in order in the radial direction from the radially inner side, it is possible to reduce the length in the radial direction in extremely complicated positions for arranging the hub (55) and the like for the first brake therein. This makes it possible to further shorten the complete brake section (42) and the automatic transmission in the axial direction.

In addition, the second brake (B2), which is acted upon by a large torque on upshifting, is positioned on the radially outer side, can reliably carry that large torque because it is positioned at a location with a larger radius and have little restrictions on space so that a comparatively large number of plates can be provided therefore. On other hand, in setting for the first brake B1 positioned on the radially inner side, there are significant restrictions on what the first brake B1 must carry is the comparatively small torque originating from the braking effect of the engine, and the first brake B1 can bear adequately the torque thereon.

What is claimed is:

1. A snap ring support device for use in an automatic transmission comprising:
    an automatic transmission mechanism section including an input shaft, at least one planetary gear unit connected to the input shaft and having rotary elements, at least one clutch for connecting the rotary elements, and stop means for stopping the rotary elements of the planetary gear unit,
    a torque converter adapted to transmit rotation of an engine output shaft to the input shaft and having a stator shaft situated in the center thereof,
    an oil pump assembly situated between the torque converter and the automatic transmission mechanism section, said oil pump assembly having a boss section in the center thereof, an annular recessed section formed at the boss section, and at least one hydraulic actuator,
    an annular flange section extending radially outwardly from one end of the stator shaft so that a snap ring groove is defined by the annular flange section of the stator shaft and the annular recessed section of the pump assembly, and
    a snap ring installed in the snap ring groove adapted to support a receiving member for a return spring of the hydraulic actuator.

2. A snap ring support device for use in an automatic transmission of claim 1 wherein:
    the oil pump assembly comprises a pump cover fabricated from an aluminum alloy material and integrally secured to the pump body, in which the hydraulic actuator is placed and an annular recesses section is formed; and the stator shaft is made of steel.

3. A snap ring support device for an automatic transmission of claim 1 wherein the stop means comprises a first brake and a second brake which are activated when an upshift is made from a first forward speed to a second forward speed, the first brake being directly linked to one of the rotary elements of the planetary gear unit, said automatic transmission mechanism section including a one-way clutch, the second brake being linked to one of the rotary elements through the one-way clutch, the one-way clutch, first brake and second brake being arranged in order from inside of the transmission to radially outwardly at a distance spaced apart from each other, the oil pump assembly having a hydraulic actuator for the first brake and a hydraulic actuator for the second brake, said hydraulic actuators for the first and second brakes being provided in order from inside of the oil pump assembly to radially outwardly at a distance spaced apart from each other, and the hydraulic actuator for the first brake having a return spring reaction borne in the snap ring groove.

4. A snap ring support device for use in an automatic transmission of claim 3, wherein:
    the first brake and the second brake are formed so that they act together in the second forward speed in the D range.

* * * * *